United States Patent [19]
Mayer et al.

[11] Patent Number: 6,100,897
[45] Date of Patent: *Aug. 8, 2000

[54] METHOD AND DEVICE FOR PICTORIAL REPRESENTATION OF SPACE-RELATED DATA

[75] Inventors: Pavel Mayer; Axel Schmidt; Joachim Sauter; Gerd Grüneis, all of Berlin, Germany

[73] Assignee: ART +COM Medientechnologie und Gestaltung GmbH, Berlin, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/767,829

[22] Filed: Dec. 17, 1996

[30] Foreign Application Priority Data

Dec. 22, 1995 [DE] Germany ............. 195 49 306

[51] Int. Cl.$^7$ ................................. G06F 15/00
[52] U.S. Cl. ............................................ 345/428
[58] Field of Search ........................ 345/426, 428, 345/419, 427, 433, 441, 132, 133, 429, 432

[56] References Cited

U.S. PATENT DOCUMENTS 4,847,788  7/1989  Shimada ........................... 364/522
5,602,564  2/1997  Iwamura .......................... 345/439

FOREIGN PATENT DOCUMENTS

0 587 443A2  3/1994  European Pat. Off. .
0 684 585A2  11/1995  European Pat. Off. .

*Primary Examiner*—Phu K. Nguyen
*Attorney, Agent, or Firm*—Marshall & Melhorn

[57] ABSTRACT

A method and device for the pictorial representation of space-related data, for example, geographical data of the earth. Such methods are used for visualising topographical or meteorological data in the form of weather maps or weather forecast films. Further fields of application are found in tourism, in traffic control, in navigation aids and also in studio technology. The space-related data, for example topography, actual cloud distribution, configurations of roads, rivers or frontiers, satellite images, actual temperatures, historical views, CAD-models, actual camera shots, are called up, stored or generated in a spatially distributed fashion. For a screen representation of a view of the object according to a field of view of a virtual observer, the required data are called up and shown only in the resolution required for each individual section of the image. The sub-division of the image into sections with different spatial resolutions is preferably effected according to the method of a binary or quadrant tree.

42 Claims, 11 Drawing Sheets

METHOD AND DEVICE FOR PICTORIAL REPRESENTATION OF SPACE-RELATED DATA

The invention relates to a method and a device for pictorial representation of space-related data, particularly geographical data of flat or physical objects. Such methods are used for example for visualising topographic or meteorological data in the form of weather maps or weather forecast films. Further fields of application arise from tourism, in traffic control, as navigation aids and in studio technology.

Representations of geographical information are generated according to prior art by using a so-called paintbox. The latter generates from given geographical information maps of a desired area, which are then selectably altered, and for example can be coloured or emphasised according to states, or even represented in an altered projection.

Another system for generating views of a topography is found in the known flight simulator. In this case, starting from a fictitious observation point from the cockpit of an aircraft, a view of the surroundings is generated.

Electronic maps, such as are marketed today on CD-ROM memories, or navigation systems in terrestrial vehicles, likewise generate from a fixed databases a diagrammatic vies of the geography of a desired area. These systems however do not have the capacity for representing various views of the area, but are restricted to mapping topographical features such as the configuration of roads, railway lines or rivers.

All the names methods and devices for visualising geographical data utilise fixed data sets in order to generate the desired images. The resolution of the representation is therefore limited to the resolution of the data sets stored in a memory unit. Further, only those space-related data can be observed which are provided in the respective data bank. Thus it is not for example possible to provide representations which have been generated on the basis of electronically stored maps in navigation systems with the actual cloud distribution over this area. On the other hand, flight simulators, due to the limited availability of memory space, are limited to representing narrowly defined areas with a pre-fixed resolution.

As representations from the previously known system are based on a fixed set of memorised data and therefore the space-related data cannot be stored at any optional resolution, none of the present systems is capable of representing different space information as desired with any resolution and at the same time incorporating actual information into the representation.

Due to the large quantities of data to be processed in the systems according to prior art, the generation of an image is either extremely costly in time, or is limited to the representation of restricted information. Consequently it is not possible with the previously known systems to provide an image generation rate which is sufficient upon alteration of the location or of the direction of view of the observer to provide the impression of a continuous movement of that observer.

The object of the present invention is to make available a method and a device for representing space-related data which enables the data to be represented in any pre-selected image resolution in the way in which the object has been seen by an observer with a selectable location and selectable direction of view. A further object of the invention is to keep the outlay for generating an image so low that the image generation takes place so rapidly that upon alteration of the location and/or of the direction of view of the observer, the impression of continuos movement above the object arises.

This object is achieved by the method according to the invention in the preamble in conjunction with the characterising features of claim 1, and by the corresponding device.

In the method according to the invention the space-related data are called up, stored and/or generated in spatially distributed data sources. These data sources include for example data memories and/or other data sources which call up and/or generate space-related data. The portion of the object to be observed, the field of view, is determined from the selected location and the selected direction of view of the observer. Then a first data set, which has a coarse spatial resolution, is called up from at least one of the spatially distributed data sources, transmitted and centrally stored, and the field of view is shown. If the resolution of the representation is below the desired image resolution, the field of view is divided into sections and an investigation is undertaken for each individual section to see whether the data within the section are sufficient for a representation with the desired image resolution. If this is not the case for one of the sections, further data with a finer resolution are called up, transmitted and centrally stored from at least one of the spatially distributed data sources, and the section is shown with the new data. In turn an investigation is carried out into sufficient image resolution and possibly a further subdivision of the tested section is carried out into further partial sections as described above. If the entire representation has the desired image resolution or if in the spatially distributed data sources no further data of a higher resolution are present, then the method is terminated.

The device according to the invention for carrying out this method accordingly comprises a display unit and an input unit for the location and the direction of view of the observer. The device according to the invention further has a plurality of spatially distributed data sources, a central data memory, a data transmission network between these and the evaluation unit, in order to determine the representation of the data on the display unit from the centrally stored data.

In comparison to previous systems, the method according to the invention has considerable advantages. By virtue of the fact that the data are called up, generated and/or stored in a spatially distributed manner, the magnitude of the available database is not limited by the size of the central data memory. In principle the amount of available data in the method according to the invention is therefore not limited, and can be extended at will. The access speed to the spatially distributed data is thus to a large extent independent of the size of the database.

In particular, due to the spatially distributed call-up and storage of the data, servicing and updating of the database can be effected in a distributed manner and preferably in the vicinity of the spatial area which is represented by the data which are called up and/or stored in a spatially distributed manner.

Representation of the field of view requires in the individual areas of the field of view different spatial resolutions of the data, for example depending on whether a portion of the field of view is in the immediate vicinity of the observer or at a great distance therefrom.

The method according to the invention leads to a situation in which the data for the field of view to be shown are called up from the spatially distributed data sources only in the accuracy necessary for representation of the field of view with the desired image resolution, i.e. for example with high spatial resolution for close areas of the field of view or in low spatial resolution in a view to the horizon of a spherical object. The number of data necessary for representation of the field of view and thus to be stored centrally is in principle determined by the image resolution selected and is thus substantially constant for each image. This applies for example independently of whether the observer is at a great distance from the object or directly beside it and whether the observer is looking frontally on to the object or in the direction of the horizon. Therefore, the outlay for data transmission for representing the various fields of view is to a large extent constant and restricted.

Furthermore, by means of the number, reduced to a minimum, of data to be centrally stored as a result of the method according to the invention, the memory requirement and computer time for generating the pictorial representation is greatly reduced, so that an extremely rapid image build-up becomes possible.

Advantageous further developments of the method according to the invention and of the device according to the invention are given in the dependent Claims.

If a change in the location or of the direction of view of the observer is input, thus the field of view also changes. Immediately after this alteration in field of view, the method according to the invention can be restarted. In this way it is possible to generate a representation which corresponds to the impression of a moving observer. This can for example be used for setting up a flight simulator.

After each transmission and central storage of data, an image representation results, even if the data are insufficient to make possible the desired image resolution. As a result, even if the method is interrupted due to an alteration in the field of view and newly begun for a new field of view, the data for an image, even at low resolution, are always available. Thus if the observer moves extremely rapidly, the case is avoided in which no further image is shown.

Thus the observer is not limited as regards his travelling speed and yet it is ensured that an image is always shown.

It is particularly advantageous if the same number of data, i.e. data with the same uniform resolution are basically also always called up for a section. Due to the division and thus reduction in size of the sections during the method according to the invention, in this way continuous refinement of the data during the course of the method according to the invention is achieved.

After alteration in the field of view, in order to reduce the central storage requirement, the high-resolution data no longer required can be removed from the central memory. If however a data set with coarse resolution which represents the entire object is permanently retained in the central memory, the representation can be improved with rapid alterations in field of view.

For objects to be viewed in the plane, the binary or the quadrant tree is suitable as a sub-division method for the field of view, while for objects, whose three-dimensional extension must be taken into account, an octant tree is particularly suitable.

By means of this sub-division according to a fixed scheme, each section of the object can be given a fixed address, the address of a section arising for example from the address of the master section, to which there is added for the sub-sections a further numeral, for example 0, 1, 2 and 3 for each of the four sub-sections of the quadrant tree, or the numerals 0 to 7 for each of the sub-sections of an octant tree. With a permanently constant number of data per section, the number of points in a section address at the same time determines the spatial resolution level of the data.

These sub-dividing processes can also be used along with one another, such an adaptive sub-division process being particularly suitable for spherical objects, whose surface is imaged two-dimensionally. In the planar representation of a spherical surface, for example at the poles, the sphere can transfer from a quadrant tree to a binary tree.

Particularly suitable as objects are heavenly bodies such as the planets of the solar system, whose topography can be represented. Further space-related data of such objects include among other things meteorological or geological information, for example cloud distributions, political, economic and social data and in particular colour information relating to the appearance of the heavenly bodies, as obtained for example for the earth from satellite images and for other planets, from images from space probes.

Consequently, any further geographically related data can be represented. The representation may in this case be carried out both according to cartographic points of view or also as a globe.

In order to provide pictorial representation of the surface of physical objects, two-dimensional representations are particularly suitable, as due to the reduction in the number of dimensions from three to two the number of co-ordinates to be processed and the data to be loaded is considerably reduced and thus the power of the method according to the invention and of the device according to the invention, for example the image repetition rate during rapid movements of the observer, is improved. Such a representation in particular is sufficient when the images are shown on a two-dimensional screen or another two-dimensional medium.

In order also to display three-dimensional information in two-dimensional images, the two-dimensional basic layer may be supplemented with other two-dimensional layers, upon which the further information is displayed.

Particularly suitable as a model for two-dimensional imaging of the surface of physical bodies is a geometric model in which the surface is sub-divided into polygons. In the topographic grid model the polygon grid imitates the topography of the surface. By means of this display the provision of the two co-ordinates of a grid point is sufficient to produce a spatial relationship between various data and the surface of the object displayed.

The data are now displayed on the background of this grid. Particularly simple is the display of height information by the application of various colours (colour vertices). Satellite images or information on cloud formations can also be laid over this grid (texturising). If the grid is not equidistant but applied with different sizes of grid squares, (adaptive grids) then it is possible better to resolve and display specific areas such for example areas with intense height alterations.

The spatially distributed raised and/or stored data of the spatially distributed data sources can be provided at the points of their raising and/or storage with references, which indicate the storage points for data of adjacent areas or further data on the same area. If such links (hyperlinks) of the spatially distributed data exist between one another, the central system requires no knowledge of the exact spatial storage points for all data of the object, as it is linked, originating from one of the spatially distributed stores, to the further data.

In principle, the location and the direction of view of the observer is not limited. Consequently the observer can move from a view with extremely limited resolution, e.g. the earth from space, to a view of individual atoms. The range of spatial resolutions covers many orders of magnitude. In order to enable any resolutions also with evaluating devices which operate internally with a limited numerical precision, for example with computers with an address space limited to 32 bits and/or floating-point view limited to 32 bits for numbers, after an alteration in the location and of the angle of view of the observer, the data are converted to a new co-ordinate system with a new co-ordinate origin. During a continuous movement of the observer therefore the co-ordinates of the data are constantly subjected to co-ordinate transformation.

If the data of areas adjoining the field of view are permanently centrally stored in a higher resolution, or if a probability assessment is carried out for a future alteration in the field of view, and the data of the areas with the highest probability are previously called up, transmitted and centrally stored, the representation can be accelerated with the desired image resolution upon a rapid alteration in the field of view.

The data illustrated by the method according to the invention, in addition to data of real properties of the system observed, can also contain models, for example CAD models of buildings, or animated objects. The representation of spatially related data, for example temperature measurement values, can also be effected by display tables inserted into the illustration. Furthermore, it is possible to move from illustrated space related spatially distributed stored data to the representation of directly generated material. Thus for example, instead of showing spatially distributed stored satellite images of the earth, direct camera images from a satellite can be shown, or instead of the illustration of a public place, images of the place generated by a running camera can be shown. In this case the satellite represents one of the spatially distributed data sources.

For data transmission from the spatially distributed data sources to the central memory, asynchronous transmission methods are suitable, because of their high data transmission rate in particular.

Embodiments of the method according to the invention and of the device according to the invention are given by way of example in the following.

Figure 1:
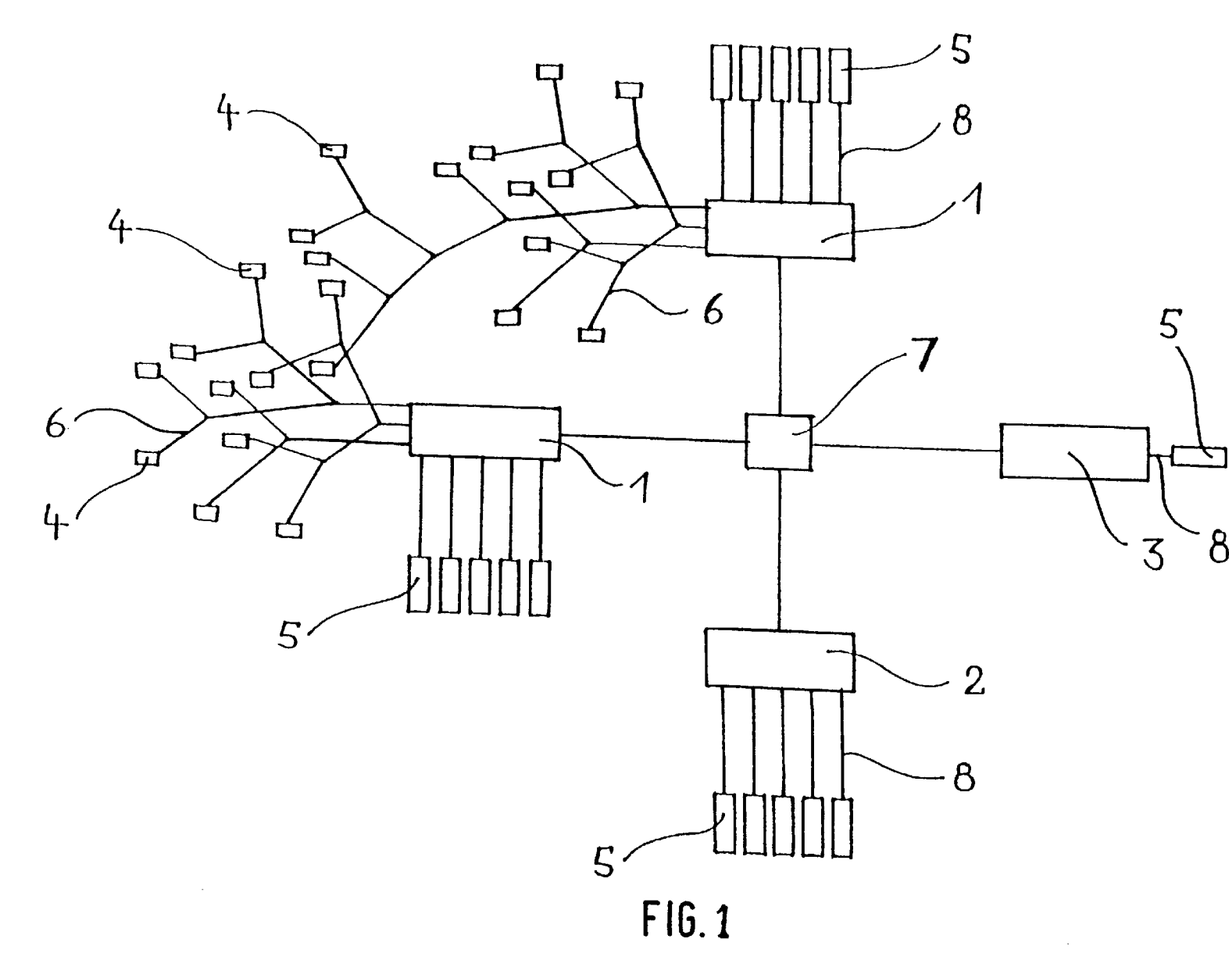
FIG. 1: a structure of a device according to the invention.

FIG. 1 shows the construction of a device according to the invention for displaying geographically related data of the earth. The device comprises a plurality of spatially distributed data sources 4, a data transmission network, a plurality of devices 1, 2 and 3 as central memories, and devices for determining the display of the centrally stored space-related data (evaluation units) and a plurality of display unit 5. This device according to the invention makes it possible for a plurality of evaluation units 1, 2 and 3 simultaneously to access the common spatially distributed data sources 4.

The data transmission device comprises a transmission network with lines 6, 7 and 8. The network has various types of conduit. The conduits 6 serve as a collecting network for transmitting data from the spatially distributed data sources 4. The conduits 7 serve as an interchange network for rapid interchange of information between individual nodes and the conduits 8 serve as a supply network for supplying the screen view from the evaluation devices 1, 2 and 3 to the display unit 5.

The nodes are in turn sub-divided into primary nodes 1, secondary nodes 2, and tertiary nodes 3. In this case a primary node is connected both to the interchange network 7 and also via the conduits 6 directly to the spatially distributed data sources and by the conduit 8 directly with the display unit 5. The secondary node 8 is connected only with the interchange network 7 and directly via the conduits 8 with the display unit 5. The tertiary node 3 has only one connection to the display unit 5 and to the interchange network 7.

Systems of the company Silicon Graphics (SGI Onyx) were used as a node computer. This computer is capable of displaying more than 5,00,000 texturised triangles per second and consequently is suitable for rapid picture build-up. It operates with floating-point views with a 32 bit representation. As this accuracy in the present example is insufficient for example to follow a movement of an observer from space continuously down to a centimetre resolution on the earth, the co-ordinates of the data during such a movement were continuously converted to a new co-ordinate system with a coordinate origin located in the vicinity of the observer.

The geographical data required for the image are called up and transmitted via the collecting network 6 from the spatially distributed memories 4. The spatially distributed memories are preferably located in the vicinity of the areas on the earth whose data they contain. In this way the data are detected, stored and serviced at the point where a knowledge of the properties to be represented by the data, such for example as topography, political or social information, etc. is most precise. Further data sources are located at the points where further data are detected or assembled, such for example as meteorological research stations which collect and process information received from satellites.

A characteristic feature of the data flow in the collector network 6 is that the data flow is in one direction. The Internet or ISDN lines were used for this network.

The interchange network 7 serves to interchange data between individual nodes. By means of close-meshed connection of the individual nodes, the network can be secured against the failure of individual conduits or against load peaks. As the interchange network 7 must guarantee a high transmission rate in both directions, a permanent connection was used here with an asynchronous transmission protocol with a transmission rate which is greater than 35 MBit/s. Satellite connections are also suitable for the interchange network 7.

In the supply network 8, substantially the image data required for representation are transmitted to the display device 5. Consequently a high data transmission rate of up to 2 MBit/s is required in the direction of the display unit, which is enabled by intrinsic asynchronous connections or by bundling ISDN connections.

Figure 2:
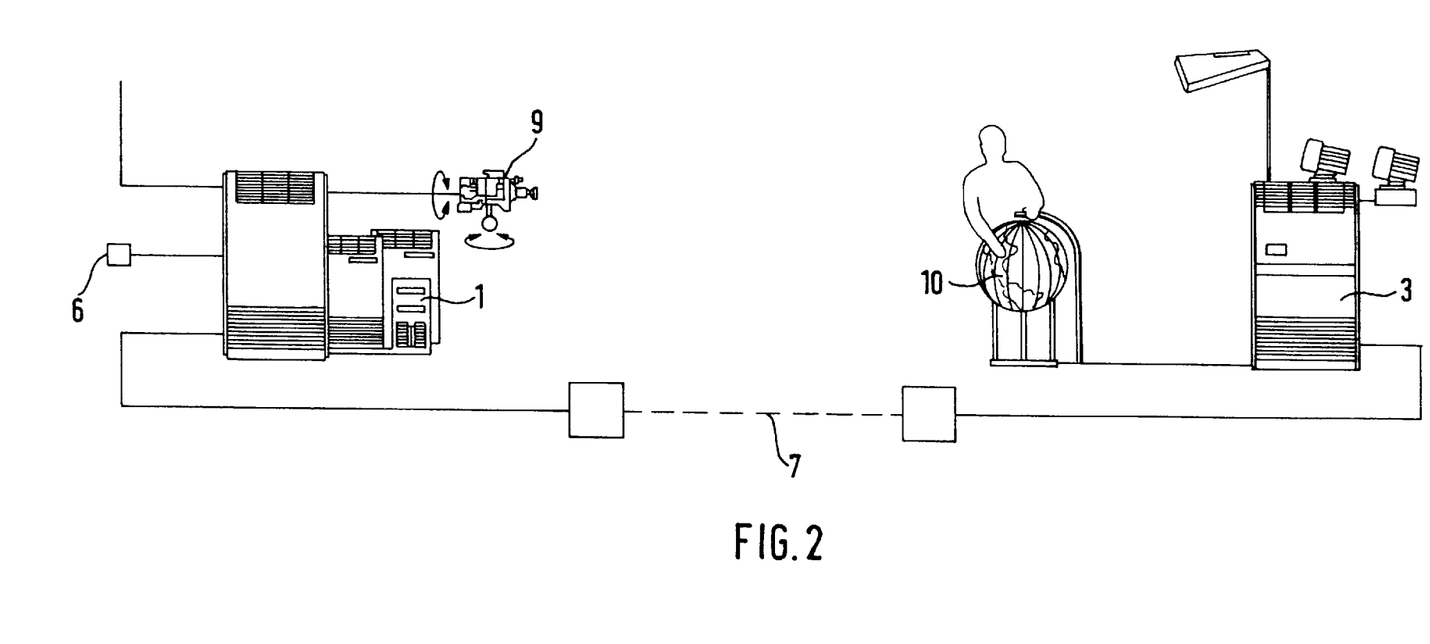
FIG. 2: a device according to the invention.

FIG. 2 shows two nodes connected by an interchange network 7, a primary node 1 and a tertiary node 3. An input medium 10 for input of the location and the direction of view of the observer is connected via the supply network 8 to the tertiary node 3. A collector network 6 and a camera 9, which can be controlled by the input medium 10, is connected to the node computer 1. The input medium 10 comprised a three-dimensional track ball in conjunction with a space-mouse with six degrees of freedom, in order to be able to alter both the location and the direction of view of the observer. Automatic position-fixing systems can also be considered as further input media, such as are used in navigation aids for motor vehicles or aircraft.

In this embodiment given by way of example, a two-dimensional polygon grid model is used to display the data, which serves as a two-dimensional co-ordinate system for positioning the data. There were used as data to be displayed, for example satellite images, i.e. information relating to the colouring of the earth surface or geopolitical data or actual or stored meteorological data. Images of the same point on the earth surface were shown at different points in time, so that a type of "time journey" could be produced.

Data in tabular form, such for example as temperature information, were masked in as display tables into the view. For certain areas, CAD-models of buildings were available, which were inserted into the view. Then the location of the observer could be displaced at will in these CAD-modelled buildings.

Via position-fixing systems, symbols, for example for ships, aircraft or motor vehicles, in their instantaneous geographical positions, can be inserted into this system and/or animated.

There was used, as a model for sub-dividing the field of view into sections and of these sections into further sections, a quadrant tree in which a progressive sub-division of an area into respectively four sections is carried out.

After selection of the earth as an object and input of a location and a direction of view in the final device 5, the node 3 determines the field of view of the observer and calls up the data via the interchange network 7 and the nodes 1 and 2. These nodes in turn call up, via the collecting network 6, from the spatially distributed data sources 4 or for example from the camera 9, the required data and transmit them over the interchange network 7 to the node 3 for central storage. The node 3 determines the representation of the data centrally stored therein and sends this transmission for viewing over the supply network 8 to the display device 5.

If the node 3 then ascertains that the required screen resolution has not been achieved with the centrally stored data, it divides the field of view according to the model of the quadrant tree into four sections and checks each section to see whether, by representation of the data contained in the sections, the required image resolution has been achieved. If the required image resolution is not achieved, the node 3 calls up further data for this section. This method is repeated for each section until the required image resolution is achieved in the entire view. Call-up of the data is effected in this example always with the same resolution of 128×128 points. Due to the sub-division of a section into four respective sub-sections, therefore, in each data transmission data are loaded which have a spatial accuracy four times higher.

Figure 3:
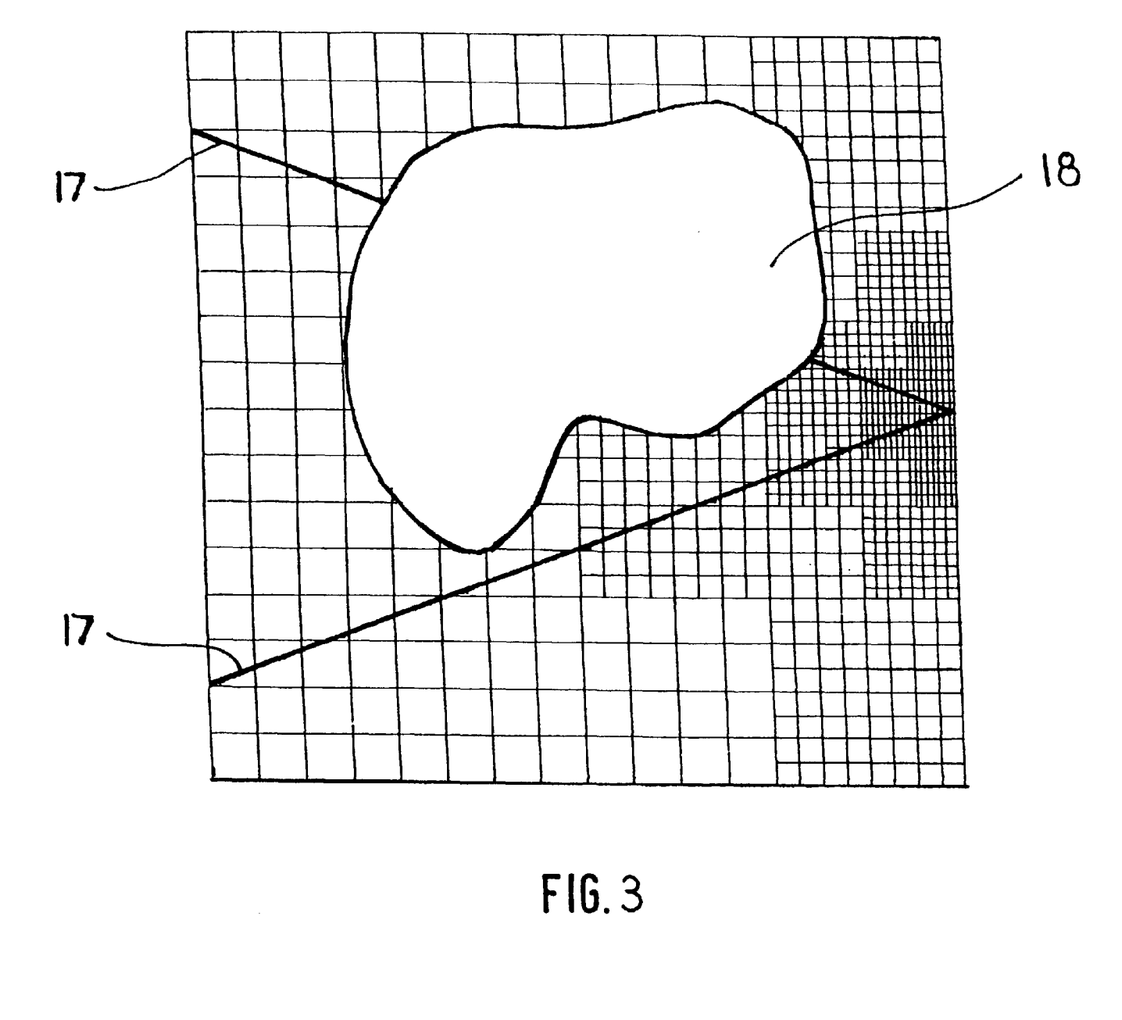
FIG. 3: a diagram of the sub-division of the field of view in two sections according to the model of a quadrant tree.

FIG. 3 shows diagrammatically the view of an object 18 by an observer whose field of view is limited by the two lines 17. As the pictorial representation remains the same, the required spatial resolution of the data depends on its distance from the observer. For objects located directly in front of the observer, data must be available with a greater spatial resolution than for objects further removed, in order to reach this image resolution.

FIG. 3 shows in all four different sub-division stages according to the model of the quadrant tree. The object entered extends within the field of view over three resolution stages in all. The data for the area of the object belonging to the field of view must therefore be loaded with greater spatial resolution in the direction of the observer.

By virtue of the fact that the data are centrally stored in sections only in the accuracy required for image resolution, the number of centrally stored data depends substantially only on the desired image resolution.

If for example one is located approximately 1,000 m above the earth surface, the field of view has an extent of approximately 50 km×50 km. The image resolution in this case should be greater than 3,000×3,000 image points. In order to show the field of view with this image resolution a height value is required every 150 m and an image value of a surface every 15 m. From this there arises a central storage requirement of approximately 35.6 MBytes, in order to store all the required information for showing the image.

If however one is located in space and has the northern hemisphere fully in field of view, then there is required for a representation with the same image resolution a height value every 50 km and an image value of the surface every 5 km. In all there arises a central storage requirement of 39.2 MBytes, which lies in the same order of magnitude as the storage requirement for representation of the view of the earth surface from a height of 1,000 m in the section 50 km×50 km.

Figure 4:
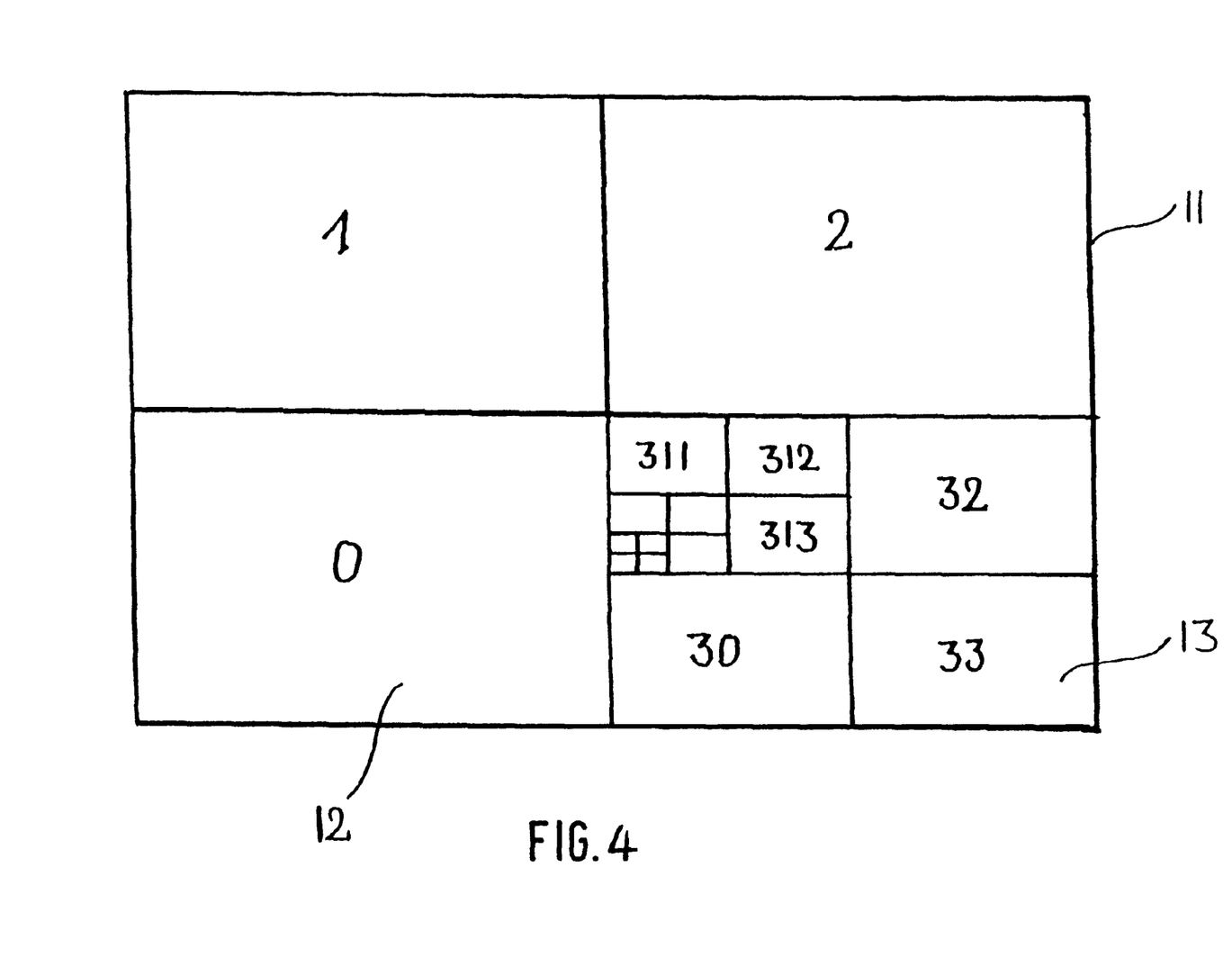
FIG. 4: a diagram of an adaptive sub-division of the field of view into a binary or quadrant structure.

FIG. 4 shows the formation of an address of a section using the model of a quadrant tree for sub-division of the field of view 11. In the first sub-division of the field of view 11 into four sections 12, these are identified clockwise with the numerals 0 to 3. If a section is further sub-divided, the individual sub-sections 13 are numbered in the same way and the numbers thus obtained are prefixed to the numbers of the master section. With a permanently identical resolution of for example 128×128 points per section, the number of points of the section number is at the same time an indication of the level of spatial precision of the data.

An advantage in this type of address formation is further that each section of the object to be represented has a fixed address which to a great extent simplifies the search for the associated data.

Figure 5:
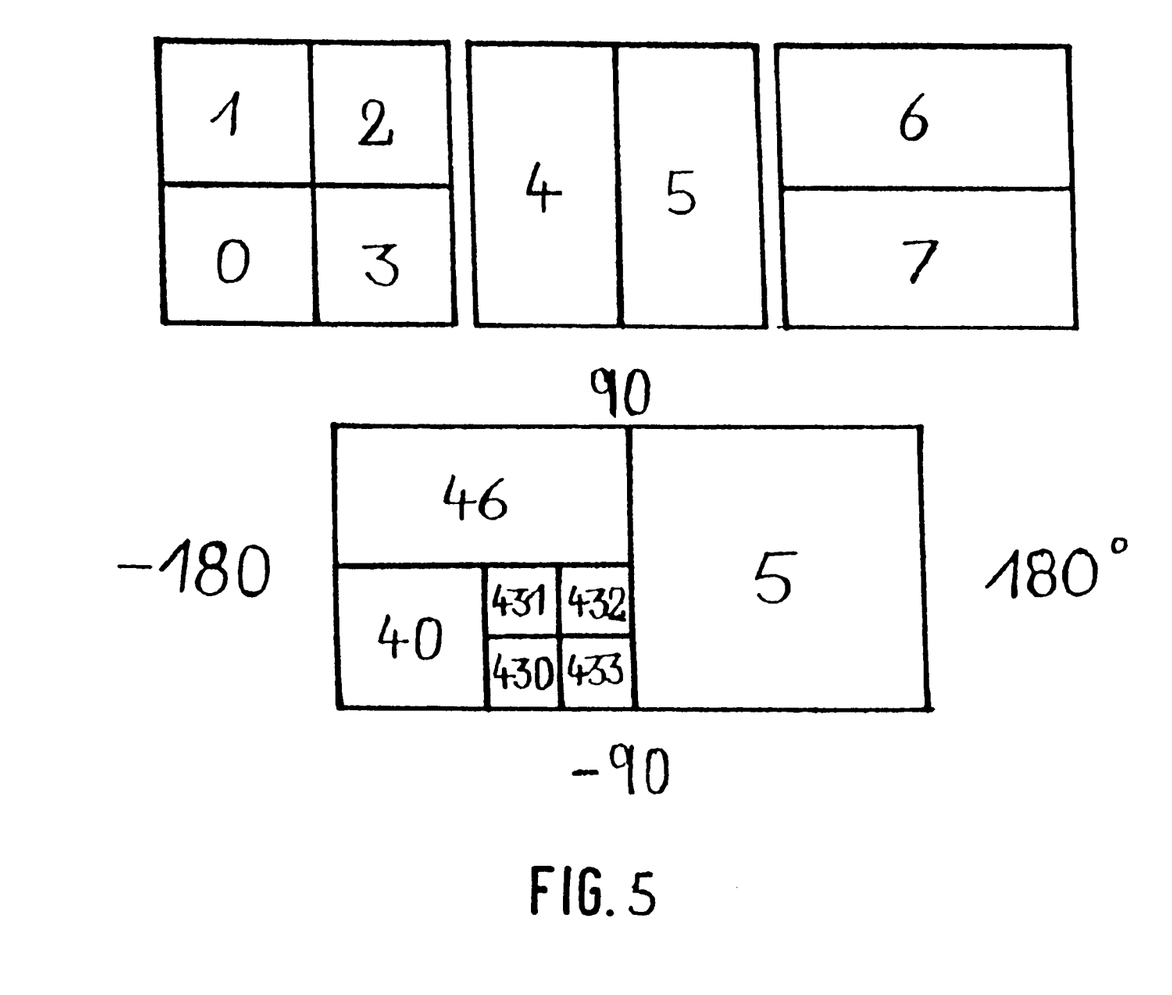
FIG. 5: a diagram of the sub-division of the field of view into sections according to the model of an octant tree.

FIG. 5 shows how a binary tree can be mixed with a quadrant tree in order to generate an adaptive sub-division model. In the upper row of the squares the sub-division is shown in two slave sections 4 and 5 (vertical) or 6 and 7 (horizontal). In the lower part of the drawing there is shown a further sub-division of the section 4 into an elongate upper portion 46 and two lower portions 40 and 43. The section 33 is then again sub-divided according to the model of a quadrant tree into four slave sections. Such an adaptive sub-division model can for example be used in representing the earth in a two-dimensional model in the region of the poles.

Figure 6:
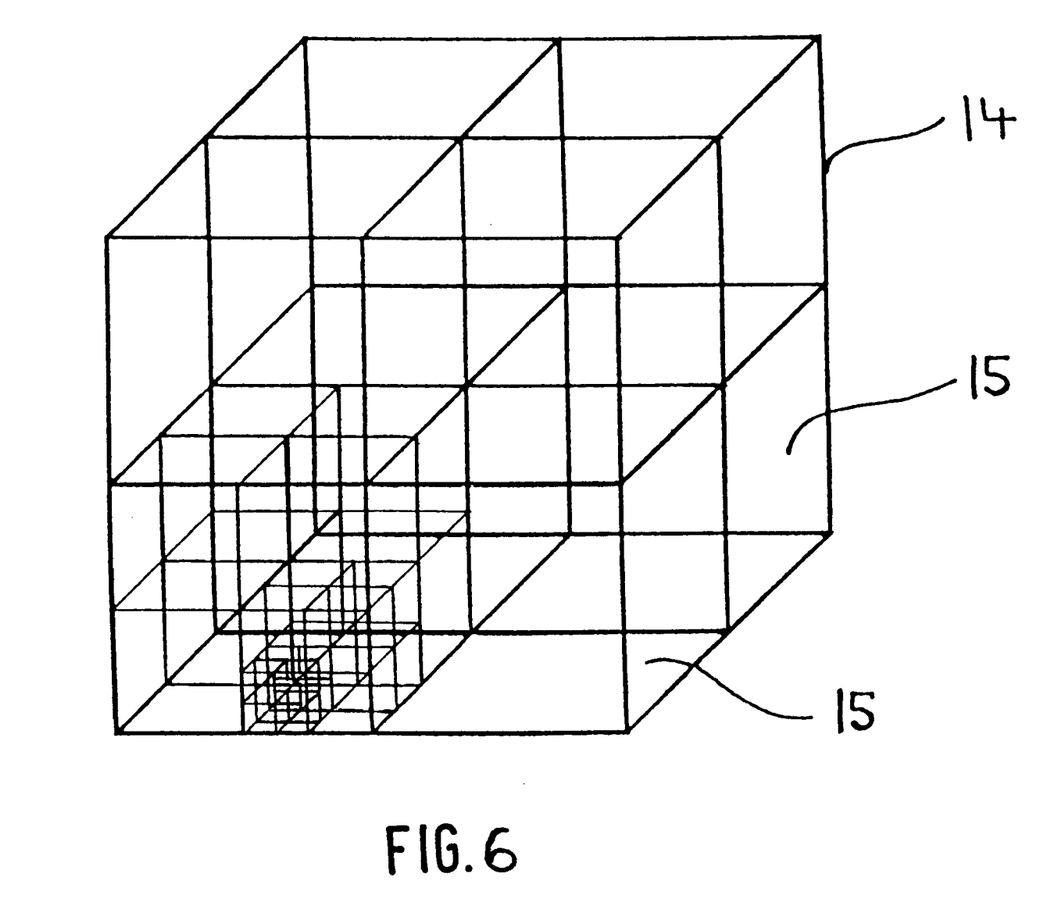
FIG. 6: the interconnection of individual data sections by transverse references.

FIG. 6 shows a sub-division according to an octant tree for a representation based on a three-dimensional geometrical model. Here a section 14 or a space is sub-divided into eight spatial sub-sections 15. By means of the method according to the invention, consequently here also the data of just the spatial areas are called up in a higher accuracy, at which it is required in order to obtain the desired image resolution. Here also the same number of points, for example 128×128×128 points can be called up, transmitted and centrally stored for each section, so that during sub-division of a master section 14 into eight slave sections 15 an improved spatial accuracy of the data in the region of the individual slave sections 15 results.

Figure 7:
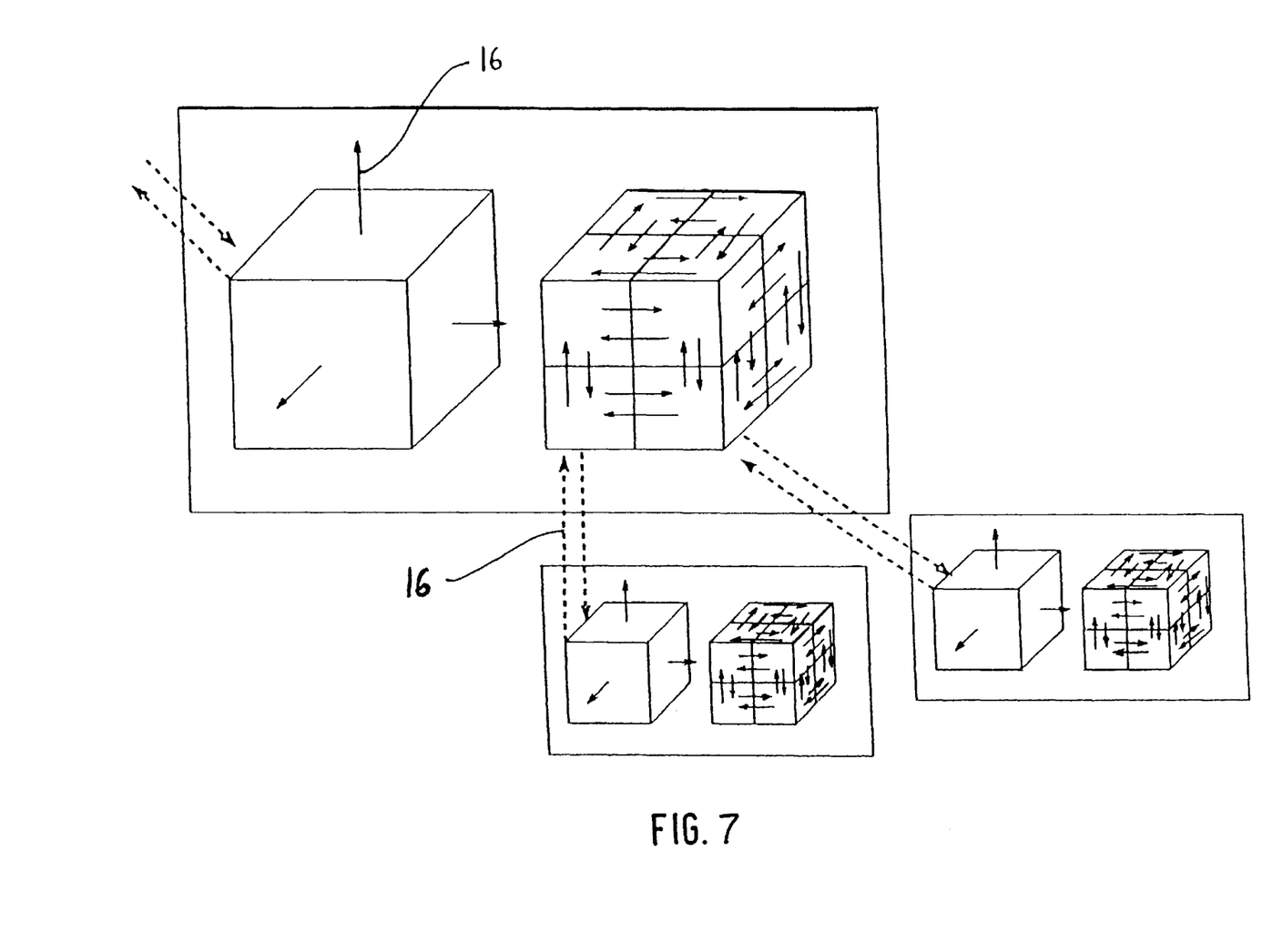
FIG. 7: the categorisation of the field of view into different detail levels.

FIG. 7 shows a model for the use of references (so-called "hyperlinks") on different section planes. The individual sections have references 16 to the storage point both of the data of adjacent sections and also of the data on other topics, but with the same spatial association. In this way, proceeding from the data of a section, data relating to the adjacent section or further data over the same section can be determined. In particular, the node 3 can call up the data of a section next to a section known to it without having intrinsic knowledge of the storage points of the adjacent section data. In this way the spatially distributed data call-up and storage systems may be expanded or updated at will, without the central store and evaluation units taking knowledge of the alteration during each such alteration.

FIGS. 8 to 11 show views of the earth generated by a method using a quadrant tree. The required data were called up from spatially distributed databases of research institutes.

Figure 8:
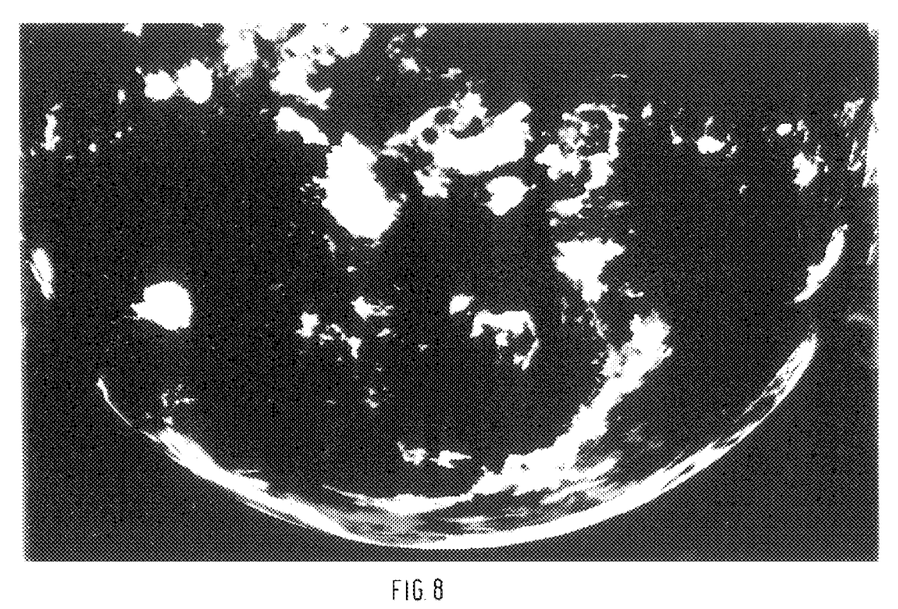
FIG. 8: a cartographic view of a cloud distribution on the earth.

FIG. 8 shows a view of cloud distribution on the earth surface as detected by a weather satellite. A cylindrical projection was used as a form of representation. The upper edge represents the north pole and the lower edge the south pole. A two-dimensional topographic grid network of the earth surface was selected as a representational model. As the cloud layer usually is at a distance from the earth surface, the cloud distribution was shown on a second layer located outwith the view of the earth surface. Thus there results, despite the only two-dimensional view for an observer, a possibility close to reality of approaching the earth surface "through" the cloud layer. Data generated by satellite surveillance systems of meteorological research institutes were used as data sources for the actual cloud distribution existing at the time of the imaging.

Figure 9:
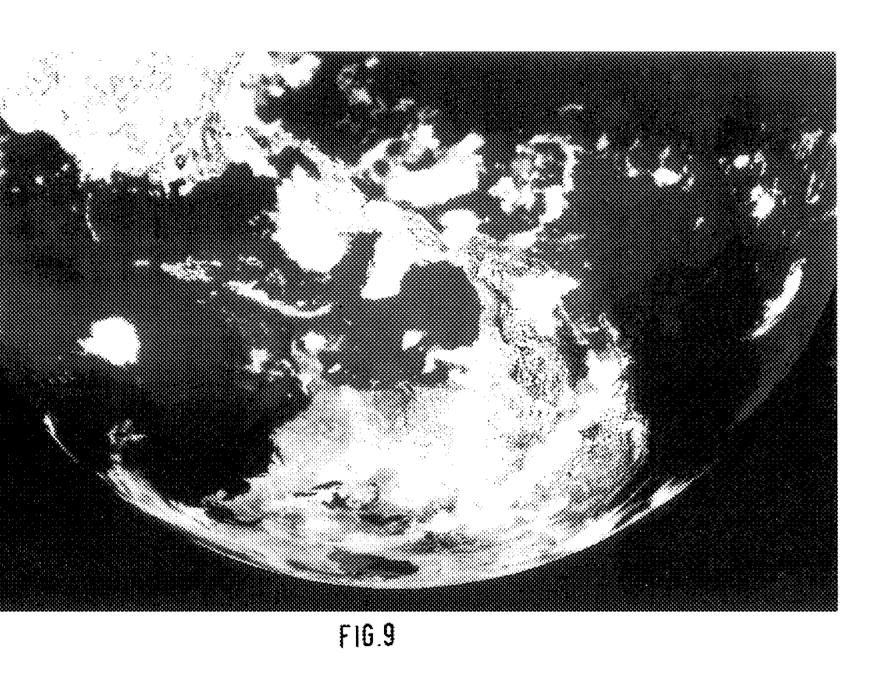
FIG. 9: a view of a cloud distribution on the earth as a globe.
Figure 10:
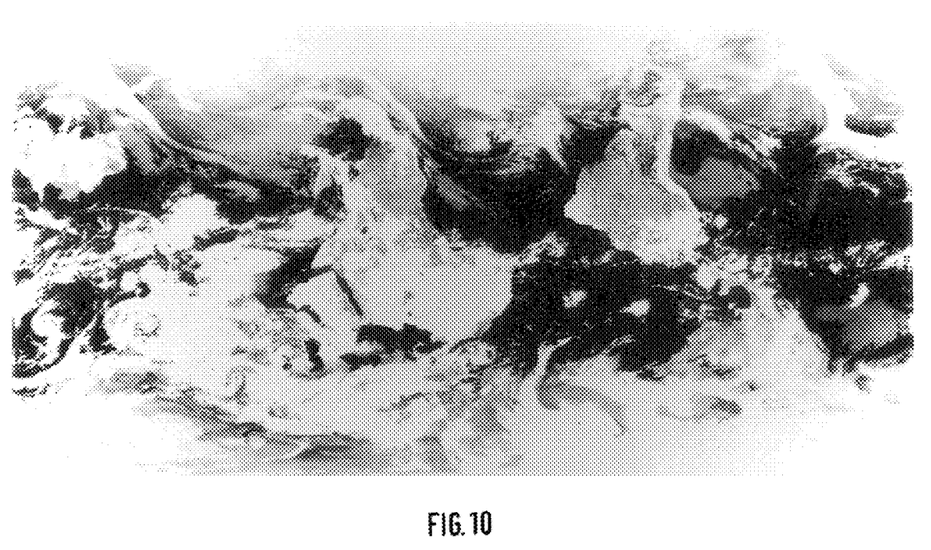
FIG. 10: a view of the earth as a globe with cloud distribution.

FIG. 9 shows the same cloud distribution. Now the earth has been shown as a globe, as it would appear to an observer is space. FIG. 10 shows a view of the same cloud distribution in connection with a representation of the land masses of the earth as they would appear to an observer in space. In order to show the view of the earth surface, the topographical grid network was provided with colour information from the pixel graphics of satellite images of the earth surface. As at the time of image generation actual cloud information was used for image generation, there was a view close to reality of the earth from space at the time of image generation.

Figure 11:
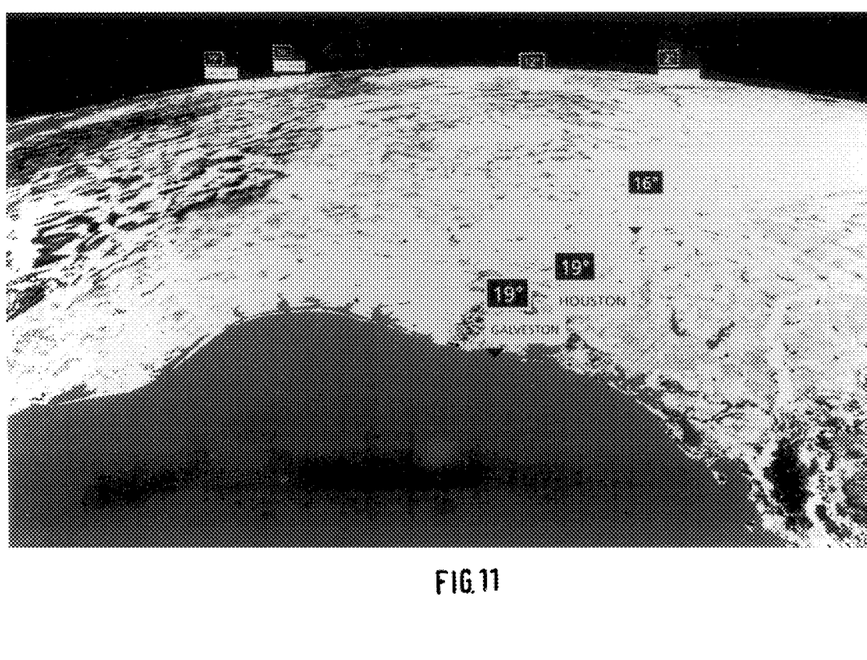
FIG. 11: a view of a portion of the earth with temperature indicator tables.

FIG. 11 shows a view generated in this way of the American Caribbean coast, as it would have appeared to an observer looking north in an orbit close to the earth above the Caribbean. In addition, the actual temperature data of selected points present in tabular form were entered in display tables into the image. These temperature data were called up and transmitted through the interchange network from various meteorological research stations at various points.

What is claimed is:

1. A method of providing a pictorial representation of space-related data of a selectable object, the representation corresponding to the view of the object by an observer with a selectable location and a selectable direction of view comprising:
   (a) providing a plurality of spatially distributed data sources for storing space-related data;
   (b) determining a field of view including the area of the object to be represented through the selection of the distance of the observer to the object and the angle of view of the observer to the object;
   (c) requesting data for the field of view from at least one of the plurality of spatially distributed data sources;
   (d) centrally storing the data for the field of view;
   (e) representing the data for the field of view in a pictorial representation having one or more sections;
   (f) dividing each of the one or more sections having image resolutions below a desired image resolution into a plurality of smaller sections, requesting higher resolution space related data for each of the smaller sections from at least one of the plurality of spatially distributed data sources, centrally storing the higher resolution space related data, and representing the data for the field of view in a pictorial representation; and
   (g) repeating step (f), dividing the sections into smaller sections, until every section has the desired image resolution or no higher image resolution data is available.

2. The method of pictorial representation defined in claim 1, further including altering the selectable location and performing steps (b) through (g).

3. The method of pictorial representation defined in claim 2, further including determining the data and/or the co-cordinates of the data in terms of a new co-ordinate system.

4. The method of pictorial representation defined in claim 1, further including altering the selectable direction of the view and performing steps (b) through (g).

5. The method of pictorial representation defined in claim 4, further including determining the data and/or the co-cordinates of the data in terms of a new co-ordinate system.

6. The method of pictorial representation defined in claim 1, wherein step (f) further includes requesting data of a uniform resolution for each of the smaller sections.

7. The method of pictorial representation defined in claim 1, wherein steps (c) and (f) further include requesting data not already centrally stored from only one of the spatially distributed data sources.

8. The method of pictorial representation defined in claim 1, wherein step (f) further includes showing only the centrally stored data of each section with the highest spatial density.

9. The method of pictorial representation defined in claim 1, wherein step (f) further includes effecting the representation of the data in an optional pre-set form of representation.

10. The method of pictorial representation defined in claim 1, further including removing the data of a section from the central store when the section passes out of the field of view due to an alteration in the location or of the angle of the view.

11. The method of pictorial representation defined in claim 1, further including permanently centrally storing at least one full set of space-related data with a low spatial resolution.

12. The method of pictorial representation defined in claim 1, further including not showing the regions of the object located with respect to the observer behind non-transparent areas of the object.

13. The method of pictorial representation defined in claim 1, wherein step (f) comprises dividing each of the one or more sections using a model of the binary tree.

14. The method of pictorial representation defined in claim 1, wherein step (f) comprises dividing each of the one or more sections using a model of the quadrant tree.

15. The method of pictorial representation defined in claim 1, wherein step (f) comprises dividing the sections using a model of the octant tree.

16. The method of pictorial representation defined in claim 1, further including using an adaptive sub-division model with a plurality of models used next to one another for sub-dividing the field of view into smaller sections.

17. The method of pictorial representation defined in claim 1, wherein the data are present as pixel graphics and/or as vector graphics and/or in tabular form.

18. The method of pictorial representation defined in claim 1, wherein the object is a heavenly body.

19. The method of pictorial representation defined in claim 18, wherein steps (e) and (f) further include representating the data with a two-dimensional polygonal geometrical model of the topography of the object, the spatial relationship of the data being given by the provision of two co-ordinates on the polygonal geometrical model.

20. The method of pictorial representation defined in claim 19, wherein height information is represented as color vertices on the two-dimensional polygonal geometrical model.

21. The method of pictorial representation defined in claim 19, wherein an adaptive topographical grid model is used, the spatial distance between two grid lines becoming smaller as the topographical altitude becomes greater.

22. The method of pictorial representation defined in claim 19, wherein step (f) further includes dividing each of the one or more sections using a model of the quadrant tree.

23. The method of pictorial representation defined in claim 22, wherein step (f) further includes dividing each of the one or more sections using an adaptive sub-division model such that the sub-division merges into a binary tree at the poles.

24. The method of pictorial representation defined in claim 19, wherein in the two-dimensional polygonal grid model, spatial data are shown on a plurality of different two-dimensional layers.

25. The method of pictorial representation defined in claim 18, wherein the representation in steps (e) and (f) is in the form of a globe.

26. The method of pictorial representation defined in claim 18, wherein the representation in steps (e) and (f) is in the form of cartographic form of representation.

27. The method of pictorial representation defined in claim 1, wherein the object is the earth.

28. The method of pictorial representation defined in claim 1, wherein steps (e) and (f) further include representing the data with a polygonal grid model.

29. The method of pictorial representation defined in claim 28, wherein step (f) comprises dividing the sections using a model of the octant tree.

30. The method of pictorial representation defined in claim 1, wherein steps (e) and (f) further include representing the data with a three-dimensional geometrical model of the topography of the objects, the spatial relationship of the data being given by the provision of three co-ordinates on the geometrical model.

31. The method of pictorial representation defined in claim 1, wherein the space-related data include CAD models.

32. The method of pictorial representation defined in claim 1, further including inserting animated objects into the pictorial representation.

33. The method of pictorial representation defined in claim 1, further including inserting display tables into the pictorial representation.

34. The method of pictorial representation defined in claim 1, further including inserting information and/or directly generated image material into the representation.

35. The method of pictorial representation defined in claim 1, wherein the directly generated image material includes camera shots.

36. The method of pictorial representation defined in claim 1, wherein the space related data are provided with references to further spatial data.

37. The method of pictorial representation defined in claim 1, wherein the space related data are provided with references to thematically adjacent data.

38. The method of pictorial representation defined in claim 1, wherein the space related data are provided with references to data of the same area with another resolution.

39. The method of pictorial representation defined in claim 1 further including determining a probability for the regions surrounding the field of view that the regions will pass into the field of view when there is an alteration in the location or of the angle of view of the observer.

40. The method of pictorial representation defined in claim 39 further including requesting and centrally storing the data of the areas with the highest probability.

41. The method of pictorial representation defined in claim 1, wherein steps (c) and (f) further include transmitting data asynchronously.

42. The method of pictorial representation defined in claim 1, wherein steps (e) and (f) further include showing the data on a screen.

* * * * *